(12) United States Patent
Nakamoto et al.

(10) Patent No.: US 10,414,440 B2
(45) Date of Patent: Sep. 17, 2019

(54) CENTER PILLAR STRUCTURE

(71) Applicant: TOYOTA JIDOSHA KABUSHIKI KAISHA, Toyota-shi, Aichi-ken (JP)

(72) Inventors: Yoshiaki Nakamoto, Nisshin (JP); Naohiko Ueno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/841,589

(22) Filed: Dec. 14, 2017

(65) Prior Publication Data

US 2018/0170444 A1    Jun. 21, 2018

(30) Foreign Application Priority Data

Dec. 19, 2016    (JP) .................................. 2016-246053

(51) Int. Cl.
   *B62D 27/02* (2006.01)
   *B62D 25/04* (2006.01)

(52) U.S. Cl.
   CPC ............. *B62D 25/04* (2013.01); *B62D 27/02* (2013.01)

(58) Field of Classification Search
   CPC ................................ B62D 25/04; B62D 27/02
   USPC ..................................................... 296/193.06
   See application file for complete search history.

(56) References Cited

U.S. PATENT DOCUMENTS

| 2010/0308623 A1 | 12/2010 | Bodin et al. |
| 2014/0191536 A1* | 7/2014 | Elfwing ................. B62D 25/04 296/193.06 |
| 2014/0239672 A1 | 8/2014 | Yajima et al. |
| 2016/0023683 A1* | 1/2016 | Nishimura ............. B62D 25/02 296/187.12 |

FOREIGN PATENT DOCUMENTS

| JP | 5063757 B2 | 10/2012 |
| JP | 5380458 B2 | 1/2014 |
| JP | 2014-193712 A | 10/2014 |
| JP | 2014-201171 A | 10/2014 |
| KR | 101509966 B1 | 4/2015 |

* cited by examiner

*Primary Examiner* — Joseph D. Pape
(74) *Attorney, Agent, or Firm* — Oliff PLC (57) ABSTRACT

A center pillar structure comprises a center pillar including a center pillar outer panel. The center pillar outer panel includes a pillar upper portion that constitutes an upper portion of the center pillar outer panel and is bonded to a roof side rail, and a pillar lower portion that constitutes a lower portion of the center pillar outer panel and is bonded to a rocker. The pillar lower portion includes a pillar lower main body portion having a tensile strength which is lower than a tensile strength of the pillar upper portion, and a high-strength portion that is disposed on the pillar lower portion and extends in the vehicle height direction, the high-strength portion having a tensile strength which is higher than the tensile strength of the pillar lower main body portion.

5 Claims, 8 Drawing Sheets

CENTER PILLAR STRUCTURE

INCORPORATION BY REFERENCE

The disclosure of Japanese Patent Application No. 2016-246053 filed on Dec. 19, 2016 including the specification, drawings and abstract is incorporated herein by reference in its entirety.

BACKGROUND

1. Technical Field

The present disclosure relates to a center pillar structure.

2. Description of Related Art

Japanese Patent No. 5380458 (JP 5380458 B) discloses a structure in which a belt-shaped low-strength portion is provided on a lower portion of a center pillar formed through hot stamping in order to control a deformation mode at the time of side collision. Furthermore, Japanese Patent No. 5063757 (JP 5063757 B) discloses a structure in which a lower portion of a center pillar is subject to plastic working by using a steel plate having a strength lower than a strength that can be obtained in die quenching.

SUMMARY

In the structure disclosed in JP 5380458 B, since the belt-shaped low-strength portion of the center pillar extends in a vertical direction at the time of side collision, an intrusion amount of the center pillar into a vehicle cabin may increase.

The disclosure provides a center pillar structure with which it is possible to further reduce a deformation amount of a portion of a center pillar which is deformed into a vehicle cabin at the time of side collision.

A first aspect relates to a center pillar structure including a center pillar. The center pillar includes a center pillar outer panel that extends in a vehicle height direction on a side portion of a vehicle, and that constitutes an outer side of the center pillar in a vehicle width direction. The center pillar outer panel includes a pillar upper portion that constitutes an upper portion of the center pillar outer panel and is bonded to a roof side rail that extends in a vehicle front-rear direction, and a pillar lower portion that constitutes a lower portion of the center pillar outer panel and is bonded to a rocker that extends in the vehicle front-rear direction. The pillar lower portion includes a pillar lower main body portion and a high-strength portion. The pillar lower portion has a tensile strength which is lower than a tensile strength of the pillar upper portion. The high-strength portion is disposed on the pillar lower portion and extends in the vehicle height direction. The high-strength portion has a tensile strength which is higher than the tensile strength of the pillar lower main body portion.

According to the aspect, the center pillar outer panel includes the pillar upper portion that constitutes the upper portion of the center pillar outer panel, and is bonded to the roof side rail, and the pillar lower portion that is positioned below the pillar upper portion, constitutes the upper portion of the center pillar outer panel and is bonded to the rocker. The pillar lower portion includes the pillar lower main body portion of which the tensile strength is lower than the tensile strength of the pillar upper portion and the high-strength portion that is disposed on the pillar lower portion while extending in the vehicle height direction and of which the tensile strength is higher than the tensile strength of the pillar lower main body portion. The pillar lower main body portion is more likely to be deformed inwards in the vehicle width direction at the time of side collision in comparison with the pillar upper portion since the tensile strength of the pillar lower main body portion is lower than the tensile strength of the pillar upper portion. Therefore, it is possible to control the center pillar such that the center pillar is deformed into an approximately J-shape as seen from a position ahead of the vehicle. In addition, the pillar lower portion is further restrained from extending in the vehicle height direction since the pillar lower portion includes the high-strength portion of which the tensile strength is higher than the tensile strength of the pillar lower main body portion. Therefore, it is possible to further reduce a deformation amount of the center pillar which is deformed into a vehicle cabin in comparison with a configuration in which the high-strength portion of which the tensile strength is higher than the tensile strength of the pillar lower main body portion is not provided.

In the aspect, the tensile strengths of the pillar upper portion and the high-strength portion may be 1500 MPa or more and the tensile strength of the pillar lower main body portion may be 980 MPa or less.

According to the aspect, the pillar upper portion and the high-strength portion of the pillar lower portion of which the tensile strengths are 1500 MPa or more are relatively unlikely to be deformed and the pillar lower main body portion of which the tensile strength is 980 MPa or less is relatively likely to be deformed. Therefore, the pillar lower main body portion is relatively likely to be deformed inwards in the vehicle width direction with respect to the pillar upper portion at the time of side collision and thus it is possible to further reduce the deformation amount of the center pillar which is deformed into the vehicle cabin while causing the center pillar to be deformed into the approximately J-shape as seen from the position ahead of the vehicle.

In the aspect, the center pillar outer panel may include an outer wall portion, a front vertical wall portion, and a rear vertical wall portion. The outer wall portion is disposed on the outer side in the vehicle width direction while extending in the vehicle front-rear direction (in the specification, the meaning of the "vehicle front-rear direction" includes a "direction approximately parallel to the vehicle front-rear direction"). The front vertical wall portion extends inwards in the vehicle width direction (in the specification, the meaning of "inwards in the vehicle width direction" includes "inwards in a direction approximately parallel to the vehicle width direction") from a front end portion of the outer wall portion in the vehicle front-rear direction. The rear vertical wall portion extends inwards in the vehicle width direction from a rear end portion of the outer wall portion in the vehicle front-rear direction.

In the aspect, the high-strength portion may be provided on the center of a portion of the outer wall portion in the vehicle front-rear direction. The outer wall portion constitutes the pillar lower portion.

In the aspect, the high-strength portion may be provided inward of a ridge on the pillar lower portion in an in-plane direction. The ridge extends along the vehicle height direction.

According to the aspect, the high-strength portion of which the tensile strength is higher than the tensile strength of the pillar lower main body portion is provided inward of the ridge on the pillar lower portion in the in-plane direction, the ridge extending along the vehicle height direction, and a portion of the pillar lower portion in the vicinity of the ridge on the pillar lower portion is relatively likely to be deformed since the tensile strength of a portion of the pillar lower portion in the vicinity of the ridge on the pillar lower portion is relatively low. Therefore, the center pillar is likely to be deformed into the approximately J-shape as seen from the position ahead of the vehicle at the time of side collision.

In the aspect, the high-strength portion may be provided above a joint between the pillar lower portion and the rocker in the vehicle height direction.

According to the aspect, the high-strength portion of which the tensile strength is higher than the tensile strength of the pillar lower main body portion is provided above the joint between the pillar lower portion and the rocker in the vehicle height direction. Accordingly, it is easy to bond a portion of the pillar lower portion of which the tensile strength is relatively low and the rocker to each other through welding or the like and it is possible to increase the strength of the joint between the pillar lower portion and the rocker.

According to the aspects, it is possible to further reduce an intrusion amount of the center pillar into the vehicle cabin at the time of side collision.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment will be described in detail with reference to drawings. Note that, an arrow FR appropriately illustrated in the drawings represents a vehicle front portion side, an arrow UP represents a vehicle upper portion side, and an arrow OUT represents the outside in a vehicle width direction.

Hereinafter, a center pillar structure according to the embodiment will be described with reference to FIGS. 1 to 5.

Figure 1:
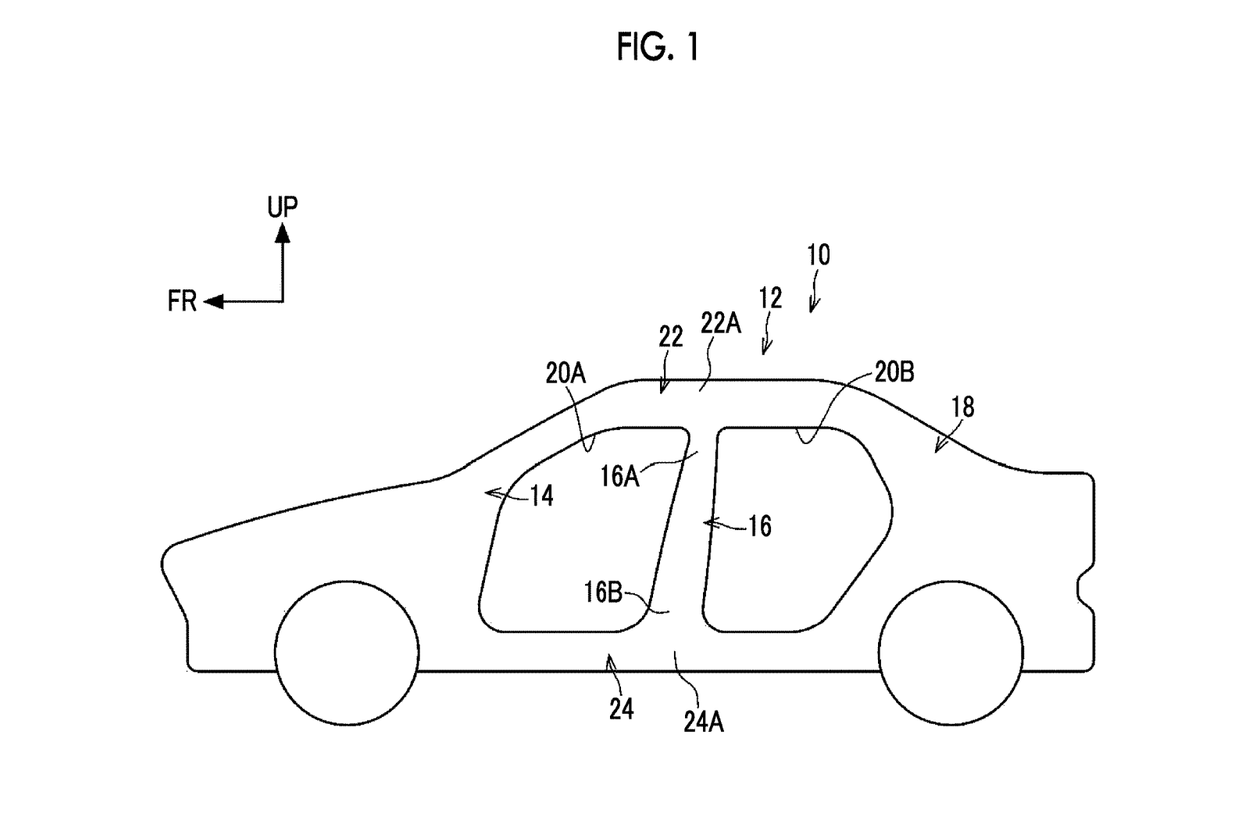
FIG. 1 is a side view illustrating a side portion of a vehicle to which a center pillar structure according to an embodiment is applied.

FIG. 1 is a schematic side view illustrating a side portion 12 of a vehicle 10 to which a center pillar structure S28 (refer to FIG. 2) of the embodiment is applied. As illustrated in FIG. 1, a front pillar 14, a center pillar 16, and a rear pillar 18 are provided on the side portion 12 of the vehicle 10 while being arranged in this order from the vehicle front portion side. Note that, the front pillar 14, the center pillar 16, and the rear pillar 18 are provided on each of right and left sides of the vehicle 10. The center pillar 16 is disposed between a front door opening 20A and a rear door opening 20B which are formed in the side portion 12 of the vehicle 10 and the center pillar 16 extends in a direction approximately parallel to a vehicle height direction. That is, the center pillar 16 is a vehicle frame member of which a longitudinal direction is the direction approximately parallel to the vehicle height direction.

A roof side rail 22 extending in a direction approximately parallel to a vehicle front-rear direction is provided above the center pillar 16. An upper end portion 16A of the center pillar 16 is joined to an intermediate portion 22A of the roof side rail 22 in the vehicle front-rear direction. The roof side rail 22 is a vehicle frame member that is disposed on each side of a roof panel (not shown) such that a longitudinal direction of the vehicle frame member becomes the direction approximately parallel to the vehicle front-rear direction, the roof panel being disposed on an upper portion of the vehicle while extending in a direction approximately parallel to the vehicle width direction and a direction approximately parallel to the vehicle front-rear direction. That is, the roof side rail 22 is disposed while extending in the direction approximately parallel to the vehicle front-rear direction and extending along upper edges of the front door opening 20A and the rear door opening 20B. A joint between the center pillar 16 and the roof side rail 22 is formed to have an approximately T-shape. In addition, a front end portion of the roof side rail 22 is joined to the front pillar 14 and a rear end portion of the roof side rail 22 is joined to the rear pillar 18.

In addition, a lower end portion 16B of the center pillar 16 is joined to an intermediate portion of a rocker 24 in the vehicle front-rear direction. The rocker 24 is a vehicle frame member that is disposed on each side of a lower portion of the vehicle 10 such that a longitudinal direction of the vehicle frame member becomes the direction approximately parallel to the vehicle front-rear direction. That is, the rocker 24 is disposed while extending in the direction approximately parallel to the vehicle front-rear direction and extending along lower edges of the front door opening 20A and the rear door opening 20B.

Figure 2:
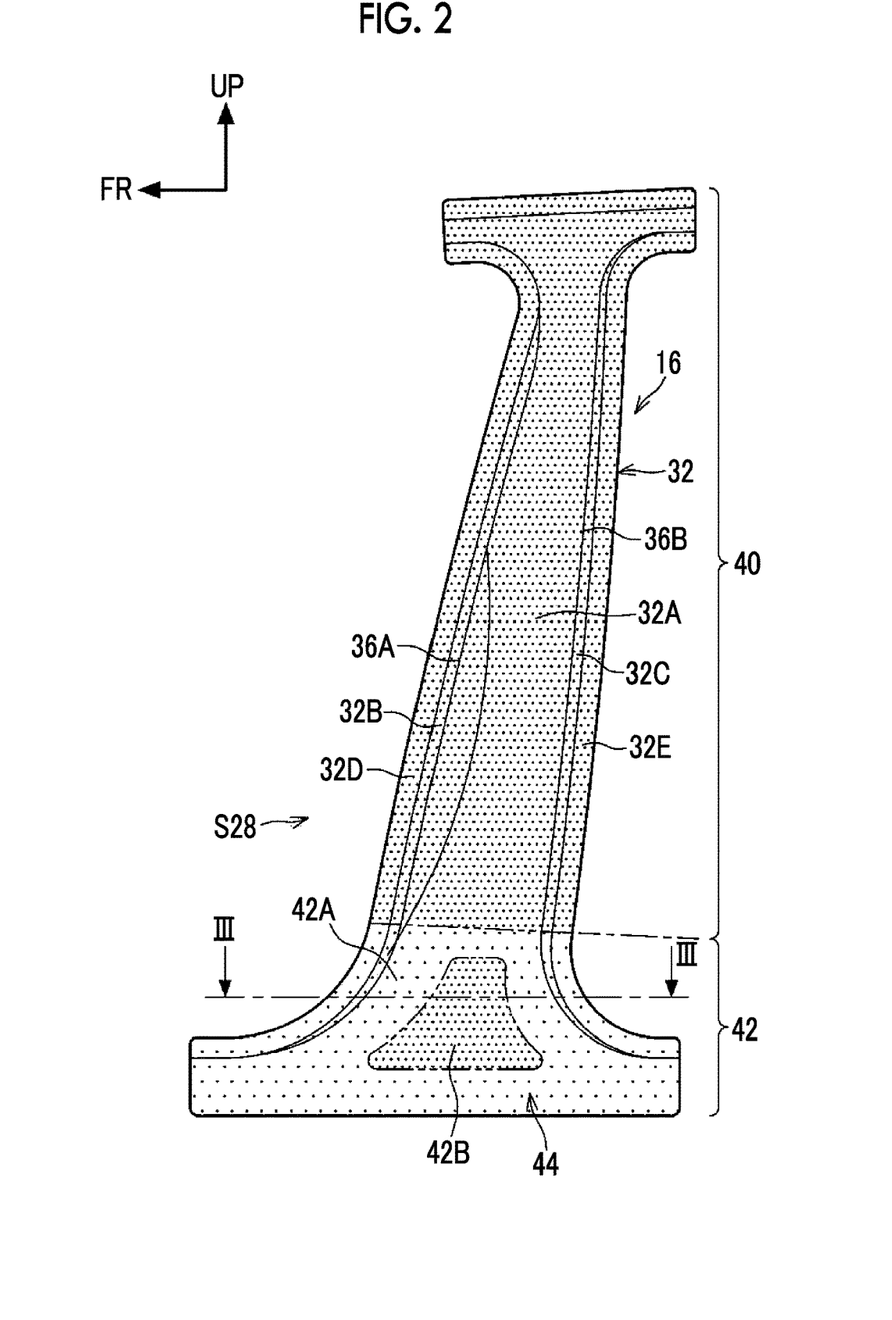
FIG. 2 is a side view illustrating a center pillar outer panel of a center pillar to which the center pillar structure according to the embodiment is applied.
Figure 3:
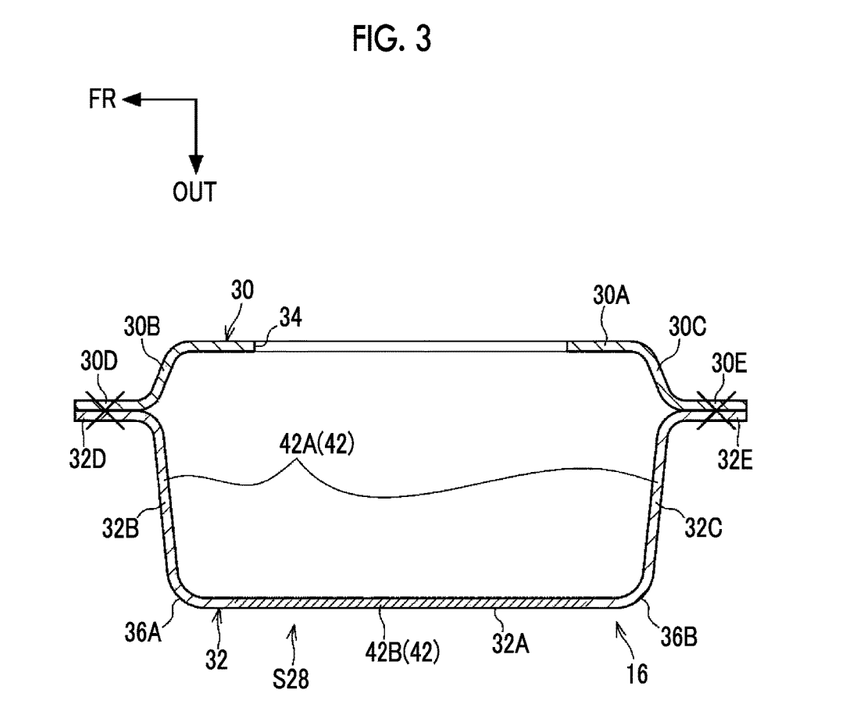
FIG. 3 is a sectional view (a sectional view taken along line III-III in FIG. 2) illustrating the center pillar outer panel and a center pillar inner panel of the center pillar to which the center pillar structure according to the embodiment is applied.

FIG. 2 illustrates a pillar outer panel 32 of the center pillar 16 to which the center pillar structure S28 of the embodiment is applied. FIG. 3 is a sectional view (a sectional view taken along line III-III in FIG. 2) illustrating the center pillar 16 to which the center pillar structure S28 of the embodiment is applied. Note that, FIGS. 2 and 3 illustrate the center pillar 16 that is on the left side of the vehicle 10 in a width direction as seen from a position behind the vehicle and a center pillar that is on the right side of the vehicle 10 in the width direction is not illustrated since the center pillars are right-left symmetrical. As illustrated in FIG. 3, the center pillar 16 is provided with a center pillar inner panel (hereinafter, abbreviated as a "pillar inner panel") 30 that is disposed on the inner side in the vehicle width direction and the center pillar outer panel (hereinafter, abbreviated as a "pillar outer panel") 32 that is disposed outward of the pillar inner panel 30 in the vehicle width direction.

Figure 4:
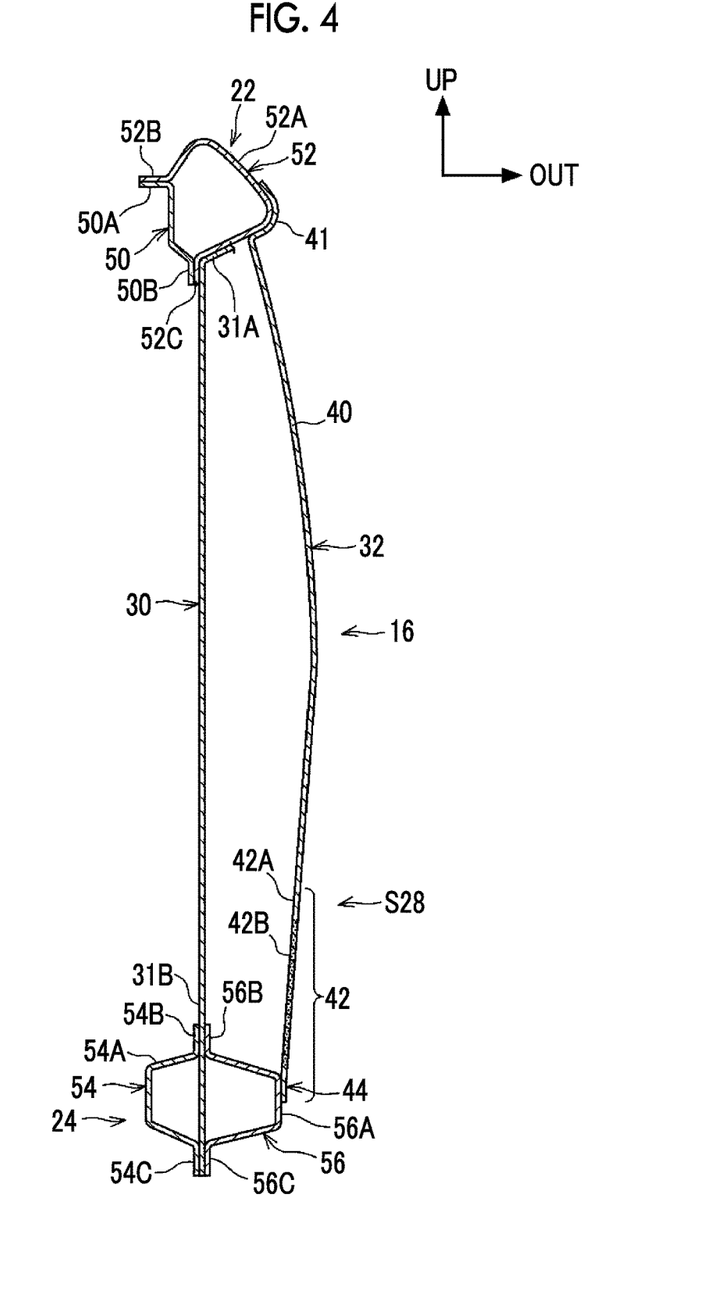
FIG. 4 is a sectional view illustrating the center pillar to which the center pillar structure according to the embodiment is applied.

The pillar inner panel 30 is disposed such that a longitudinal direction of the pillar inner panel 30 becomes the direction approximately parallel to the vehicle height direction (refer to FIG. 4). A section of the pillar inner panel 30 cut along horizontal directions (the direction approximately parallel to the vehicle width direction and the direction approximately parallel to the vehicle front-rear direction) has an approximately hat shape that opens outwards in the vehicle width direction. More specifically, the pillar inner panel 30 includes an inner wall portion 30A that is disposed on the inner side in the vehicle width direction while extending in the direction approximately parallel to the vehicle front-rear direction, a vertical wall portion 30B that extends outwards in the direction approximately parallel to the vehicle width direction from a front end portion of the inner wall portion 30A in the vehicle front-rear direction, and a vertical wall portion 30C that extends outwards in the direction approximately parallel to the vehicle width direction from a rear end portion of the inner wall portion 30A in the vehicle front-rear direction. Furthermore, the pillar inner panel 30 includes a flange portion 30D that extends toward the vehicle front portion side from an outer end portion of the vertical wall portion 30B in the vehicle width direction and a flange portion 30E that extends toward a vehicle rear portion side from an outer end portion of the vertical wall portion 30C in the vehicle width direction.

A pair of front and rear vertical wall portions 30B, 30C is obliquely disposed such that a gap between the vertical wall portions 30B, 30C in the vehicle front-rear direction becomes small toward the inner side in the vehicle width direction. An opening 34 is formed in the inner wall portion 30A. The opening 34 is provided in a lower portion of the inner wall portion 30A of the pillar inner panel 30 in the vehicle height direction. The opening 34 of the pillar inner panel 30 is provided in order to avoid interference from a seat belt winding portion (not shown).

The pillar outer panel 32 is disposed such that a longitudinal direction of the pillar outer panel 32 becomes the direction approximately parallel to the vehicle height direction (refer to FIG. 2). A section of the pillar outer panel 32 cut along horizontal directions (the direction approximately parallel to the vehicle width direction and the direction approximately parallel to the vehicle front-rear direction) has an approximately hat shape that opens inwards in the vehicle width direction. More specifically, the pillar outer panel 32 includes an outer wall portion 32A that is disposed on the outer side in the vehicle width direction while extending in the direction approximately parallel to the vehicle front-rear direction, a front vertical wall portion 32B that extends inwards in the direction approximately parallel to the vehicle width direction from a front end portion of the outer wall portion 32A in the vehicle front-rear direction, and a rear vertical wall portion 32C that extends inwards in the direction approximately parallel to the vehicle width direction from a rear end portion of the outer wall portion 32A in the vehicle front-rear direction. Furthermore, the pillar outer panel 32 includes a flange portion 32D that extends toward the vehicle front portion side from an inner end portion of the front vertical wall portion 32B in the vehicle width direction and a flange portion 32E that extends toward the vehicle rear portion side from an inner end portion of the rear vertical wall portion 32C in the vehicle width direction.

A pair of front and rear vertical wall portions 32B, 32C is disposed obliquely such that a gap between the front and rear vertical wall portions 32B, 32C in the vehicle front-rear direction becomes small toward the outer side in the vehicle width direction. A ridge 36A is formed along the direction approximately parallel to the vehicle height direction between the outer wall portion 32A and the front vertical wall portion 32B. A ridge 36B is formed along the direction approximately parallel to the vehicle height direction between the outer wall portion 32A and the rear vertical wall portion 32C.

The flange portion 32D of the pillar outer panel 32 is bonded to the flange portion 30D of the pillar inner panel 30 through welding (in the embodiment, spot welding) in a state where the flange portion 32D and the flange portion 30D overlap each other. The flange portion 32E of the pillar outer panel 32 is bonded to the flange portion 30E of the pillar inner panel 30 through welding (in the embodiment, spot welding) in a state where the flange portion 32D and the flange portion 30D overlap each other. Accordingly, the pillar outer panel 32 and the pillar inner panel 30 form a closed-section structure.

As illustrated in FIG. 2, the pillar outer panel 32 includes a pillar upper portion 40 that constitutes an upper portion of the pillar outer panel 32 and a pillar lower portion 42 that constitutes a lower portion of the pillar outer panel 32. In the embodiment, the pillar lower portion 42 is a lower portion of the pillar outer panel 32 in the vehicle height direction. In addition, the pillar upper portion 40 is a portion of the pillar outer panel 32 other than the pillar lower portion 42, that is, a portion extending toward the vehicle upper portion side from an intermediate portion that includes a lower portion of the pillar outer panel 32 in the vehicle height direction. The pillar upper portion 40 is bonded to the roof side rail 22 (refer to FIG. 4). The pillar lower portion 42 is bonded to the rocker 24 (refer to FIG. 4).

The pillar lower portion 42 includes a pillar lower main body portion 42A of which the tensile strength is lower than the tensile strength of the pillar upper portion 40 and a high-strength portion 42B that is disposed in an intermediate portion of the pillar lower portion 42 in the vehicle front-rear direction while extending in the vehicle height direction and of which the tensile strength is higher than the tensile strength of the pillar lower main body portion 42A.

The pillar outer panel 32 is formed by, for example, subjecting a high tensile strength steel sheet or a hot stamp material (an HS material) which is a super high tensile strength steel sheet to press working. Here, the "high tensile strength steel sheet" means a steel sheet having a tensile strength higher than that of general steel sheets and mainly means a steel sheet having a tensile strength of 440 MPa or more. In addition, the "super high tensile strength steel sheet" means a high tensile strength steel sheet having a tensile strength of 980 MPa or more.

In the embodiment, the tensile strengths of the pillar upper portion 40 and the high-strength portion 42B are, for example, 1500 MPa or more. The tensile strength of the pillar lower main body portion 42A is, for example, 980 MPa or less.

The high-strength portion 42B is provided inward of the ridges 36A, 36B on the pillar lower portion 42 in an in-plane direction, the ridges 36A, 36B extending along the vehicle height direction. In other words, the high-strength portion 42B is provided in the outer wall portion 32A that is disposed inward of the ridges 36A, 36B on the pillar lower portion 42 in the vehicle front-rear direction (refer to FIG. 3). The high-strength portion 42B has an approximately trapezoidal shape as seen from a position beside the vehicle and has a shape in which the area of a lower portion in the vehicle height direction is greater than the area of an upper portion in the vehicle height direction.

The high-strength portion 42B is provided above a joint 44 between the pillar lower portion 42 and the rocker 24 in the vehicle height direction (refer to FIG. 4).

Here, a manufacturing method of the pillar upper portion 40, the pillar lower main body portion 42A, and the high-strength portion 42B of the pillar outer panel 32 will be described.

The first manufacturing method is a method of heating a steel sheet and subjecting the heated steel sheet to plastic working by using a mold attached to a pressing device while rapidly cooling a region corresponding to the pillar upper portion 40 and a region corresponding to the high-strength portion 42B by bring the regions into contact with the mold such that a hot stamp material of which the tensile strengths are 1500 MPa or more (the pillar upper portion 40 and the high-strength portion 42B) is manufactured. In addition, a region corresponding to the pillar lower main body portion 42A is not rapidly cooled and is slowly cooled with the mold heated such that the pillar lower main body portion 42A of which the tensile strength is 980 MPa or less is manufactured. In this manner, the pillar outer panel 32 illustrated in FIG. 2 is manufactured.

The second manufacturing method is a method of heating a steel sheet and subjecting the heated steel sheet to plastic working by using a mold attached to a pressing device while rapidly cooling the entire pillar outer panel 32 by bring the pillar outer panel 32 into contact with the mold such that a hot stamp material for the entire pillar outer panel 32 of which the tensile strength is 1500 MPa or more is manufactured. Thereafter, a region corresponding to the pillar lower main body portion 42A is heated again and tempered such that the pillar lower main body portion 42A of which the tensile strength is 980 MPa or less is manufactured. In this manner, the pillar outer panel 32 illustrated in FIG. 2 is manufactured.

As illustrated in FIG. 4, the roof side rail 22 is provided with a roof side rail inner panel (hereinafter, abbreviated as a "rail inner panel") 50 that is disposed on the inner side in the vehicle width direction and a roof side rail outer panel (hereinafter, abbreviated as a "rail outer panel") 52 that is disposed outward of the rail inner panel 50 in the vehicle width direction. The rail inner panel 50 constitutes an inner portion of the roof side rail 22 in the vehicle width direction and is disposed on the upper portion of the vehicle such that a longitudinal direction of the rail inner panel 50 becomes parallel to the vehicle front-rear direction. The rail inner panel 50 includes an upper flange portion 50A that extends inwards in the vehicle width direction from an upper portion of the rail inner panel 50 in the vehicle height direction and a lower flange portion 50B that extends toward a vehicle lower portion side from a lower portion of the rail inner panel 50 in the vehicle height direction.

The rail outer panel 52 constitutes an outer portion that is disposed outward of the rail inner panel 50 in the vehicle width direction and is disposed on the upper portion of the vehicle such that a longitudinal direction of the rail outer panel 52 becomes parallel to the vehicle front-rear direction. A section of the rail outer panel 52 cut along the direction approximately parallel to the vehicle height direction and the direction approximately parallel to the vehicle width direction has an approximately hat shape and opens inwards in the vehicle width direction. The rail outer panel 52 includes a wall portion 52A that protrudes outwards in the vehicle width direction, an upper flange portion 52B that extends inwards in the vehicle width direction from an inner end portion of the wall portion 52A in the vehicle width direction, and a lower flange portion 52C that extends toward the vehicle lower portion side from an end portion of the wall portion 52A that is on the vehicle lower portion side. The upper flange portion 52B of the rail outer panel 52 is bonded to an upper surface of the upper flange portion 50A of the rail inner panel 50 through welding in a state where the upper flange portion 52B and the upper flange portion 50A overlap each other. The lower flange portion 52C of the rail outer panel 52 is bonded to an outer surface of the lower flange portion 50B of the rail inner panel 50 through welding in a state where the lower flange portion 52C and the lower flange portion 50B overlap each other. Accordingly, the rail outer panel 52 and the rail inner panel 50 form a closed-section structure.

An upper end portion 41 of the pillar upper portion 40 of the pillar outer panel 32 is curved along the wall portion 52A of the rail outer panel 52. The upper end portion 41 of the pillar upper portion 40 is bonded to the wall portion 52A of the rail outer panel 52 through welding or the like. In addition, an upper end portion 31A of the pillar inner panel 30 is curved along the wall portion 52A of the rail outer panel 52. The upper end portion 31A of the pillar inner panel 30 is bonded to the wall portion 52A of the rail outer panel 52 through welding or the like.

Note that, the configurations of a joint between the pillar outer panel 32 and the roof side rail 22 and a joint between the pillar inner panel 30 and the roof side rail 22 are not limited to configurations illustrated in FIG. 4 and are changeable. For example, the upper end portion of the pillar inner panel may be bonded through welding or the like in a state of being interposed between the lower flange portion 52C of the rail outer panel 52 and the lower flange portion 50B of the rail inner panel 50.

As illustrated in FIG. 4, the rocker 24 is provided with a rocker inner panel 54 that is disposed on the inner side in the vehicle width direction and a rocker outer panel 56 that is disposed outward of the rocker inner panel 54 in the vehicle width direction. The rocker inner panel 54 constitutes an inner portion of the rocker 24 in the vehicle width direction and is disposed on the lower portion of the vehicle such that a longitudinal direction of the rocker inner panel 54 becomes parallel to the vehicle front-rear direction. A section of the rocker inner panel 54 cut along the direction approximately parallel to the vehicle height direction and the direction approximately parallel to the vehicle width direction has an approximately hat shape and opens outwards in the vehicle width direction. The rocker inner panel 54 includes a wall portion 54A that protrudes inwards in the vehicle width direction and has a U-shaped section, an upper flange portion 54B that extends toward the vehicle upper portion side from a vehicle upper portion side outer end portion of the wall portion 54A in the vehicle width direction, and a lower flange portion 54C that extends toward the vehicle lower portion side from a vehicle lower portion side outer end portion of the wall portion 54A in the vehicle width direction.

The rocker outer panel 56 constitutes an outer portion of the rocker 24 in the vehicle width direction and is disposed on the lower portion of the vehicle such that a longitudinal direction of the rocker outer panel 56 becomes parallel to the vehicle front-rear direction. A section of the rocker outer panel 56 cut along the direction approximately parallel to the vehicle height direction and the direction approximately parallel to the vehicle width direction has an approximately hat shape and opens inwards in the vehicle width direction. The rocker outer panel 56 includes a wall portion 56A that protrudes outwards in the vehicle width direction and has a U-shaped section, an upper flange portion 56B that extends toward the vehicle upper portion side from a vehicle upper portion side inner end portion of the wall portion 56A in the vehicle width direction, and a lower flange portion 56C that extends toward the vehicle lower portion side from a vehicle lower portion side inner end portion of the wall portion 56A in the vehicle width direction.

The upper flange portion 56B of the rocker outer panel 56 and the upper flange portion 54B of the rocker inner panel 54 are disposed such that a lower end portion 31B of the pillar inner panel 30 is interposed between the upper flange portion 56B and the upper flange portion 54B. In this state, the upper flange portion 56B of the rocker outer panel 56, the lower end portion 31B of the pillar inner panel 30, and the upper flange portion 54B of the rocker inner panel 54 are bonded to each other through welding. The lower flange portion 56C of the rocker outer panel 56 and the lower flange portion 54C of the rocker inner panel 54 are disposed such that the lower end portion 31B of the pillar inner panel 30 is interposed between the lower flange portion 56C and the lower flange portion 54C. In this state, the lower flange portion 56C of the rocker outer panel 56, the lower end portion 31B of the pillar inner panel 30, and the lower flange portion 54C of the rocker inner panel 54 are bonded to each other through welding. Accordingly, the rocker outer panel 56 and the rocker inner panel 54 form a closed-section structure in a state where the lower end portion 31B of the pillar inner panel 30 is interposed between the rocker outer panel 56 and the rocker inner panel 54.

The pillar lower portion 42 of the pillar outer panel 32 is disposed being in a state of being in surface-contact with a protruding surface of the wall portion 56A of the rocker outer panel 56 that protrudes outwards in the vehicle width direction and the pillar lower portion 42 and the wall portion 56A of the rocker outer panel 56 are bonded to each other at the joint 44 that is formed through welding.

Note that, the configurations of a joint between the pillar outer panel 32 and the rocker 24 and a joint between the pillar inner panel 30 and the rocker 24 are not limited to configurations illustrated in FIG. 4 and are changeable. In addition, although not shown, a side outer panel is provided to cover the outer side of the center pillar 16, the roof side rail 22, and the rocker 24 in the vehicle width direction.

Next, an operation and an effect of the center pillar structure S28 of the embodiment will be described.

As illustrated in FIG. 2, the pillar outer panel 32 includes the pillar upper portion 40 that extends in the vehicle height direction on a side portion of the vehicle, is disposed on the outer side in the vehicle width direction, and is bonded to the roof side rail 22 and a pillar lower portion 42 that is positioned below the pillar upper portion 40 and is bonded to the rocker 24. The pillar lower portion 42 includes the pillar lower main body portion 42A of which the tensile strength is lower than the tensile strength of the pillar upper portion 40 and the high-strength portion 42B that is disposed on the pillar lower portion 42 while extending in the vehicle height direction and of which the tensile strength is higher than the tensile strength of the pillar lower main body portion 42A.

Figure 5:
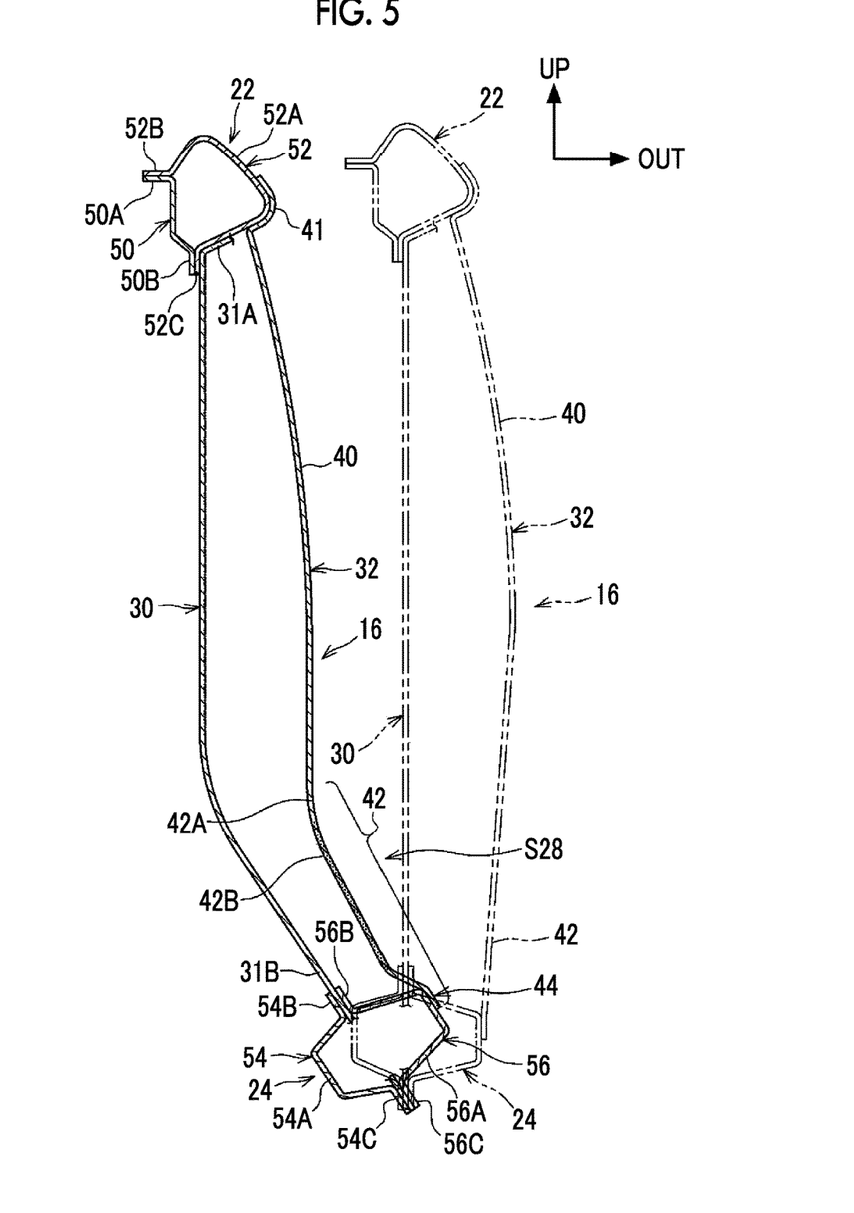
FIG. 5 is a sectional view illustrating a deformation mode of the center pillar at the time of side collision in the center pillar structure according to the embodiment.

In FIG. 5, a state before the center pillar 16 is deformed is illustrated with imaginary lines (two-dot chain lines) and a deformation mode of the center pillar 16 at the time of side collision is illustrated with solid lines. As illustrated in FIG. 5, in the center pillar structure S28, the pillar lower main body portion 42A is more likely to be deformed inwards in the vehicle width direction at the time of side collision in comparison with the pillar upper portion 40 since the tensile strength of the pillar lower main body portion 42A is lower than the tensile strength of the pillar upper portion 40. Therefore, it is possible to control the center pillar 16 such that the center pillar 16 is deformed into an approximately J-shape as seen from a position ahead of the vehicle with the pillar lower main body portion 42A of the center pillar 16 being deformed inwards in the vehicle width direction. In addition, the pillar lower portion 42 is further restrained from extending in the vehicle height direction since the pillar lower portion 42 includes the high-strength portion 42B of which the tensile strength is higher than the tensile strength of the pillar lower main body portion 42A. Therefore, it is possible to further reduce an intrusion amount of the center pillar 16 into a vehicle cabin (in the vehicle width direction).

In addition, in the center pillar structure S28, the tensile strengths of the pillar upper portion 40 and the high-strength portion 42B are 1500 MPa or more and the tensile strength of the pillar lower main body portion 42A is 980 MPa or less. Accordingly, the pillar upper portion 40 and the high-strength portion 42B of the pillar lower portion 42 of which the tensile strengths are 1500 MPa or more are unlikely to be deformed and the pillar lower main body portion 42A of which the tensile strength is 980 MPa or less is likely to be deformed. Therefore, the pillar lower main body portion 42A is likely to be deformed inwards in the vehicle width direction with respect to the pillar upper portion 40 at the time of side collision and thus it is possible to further reduce the intrusion amount of the center pillar 16 into the vehicle cabin (in the vehicle width direction) while causing the center pillar 16 to be deformed into the approximately J-shape as seen from the position ahead of the vehicle.

In addition, in the center pillar structure S28, the high-strength portion 42B of the pillar lower portion 42 is provided inward of the ridges 36A, 36B on the pillar lower portion 42 in the in-plane direction, the ridges 36A, 36B extending along the vehicle height direction (refer to FIGS. 2 and 3). That is, the vicinity of the ridges on the pillar lower portion 42 is relatively likely to be deformed since the tensile strength of the vicinity of the ridges on the pillar lower portion 42 is relatively low. Therefore, the center pillar 16 is likely to be deformed into the approximately J-shape as seen from the position ahead of the vehicle at the time of side collision.

Furthermore, in the center pillar structure S28, the high-strength portion 42B is provided above the joint 44 between the pillar lower portion 42 and the rocker 24 (refer to FIG. 4) in the vehicle height direction (refer to FIG. 2). Accordingly, it is easy to bond a portion of the pillar lower portion 42 of which the tensile strength is relatively low and the rocker 24 to each other through welding or the like and it is possible to increase the strength of the joint 44 between the pillar lower portion 42 and the rocker 24.

Figure 6:
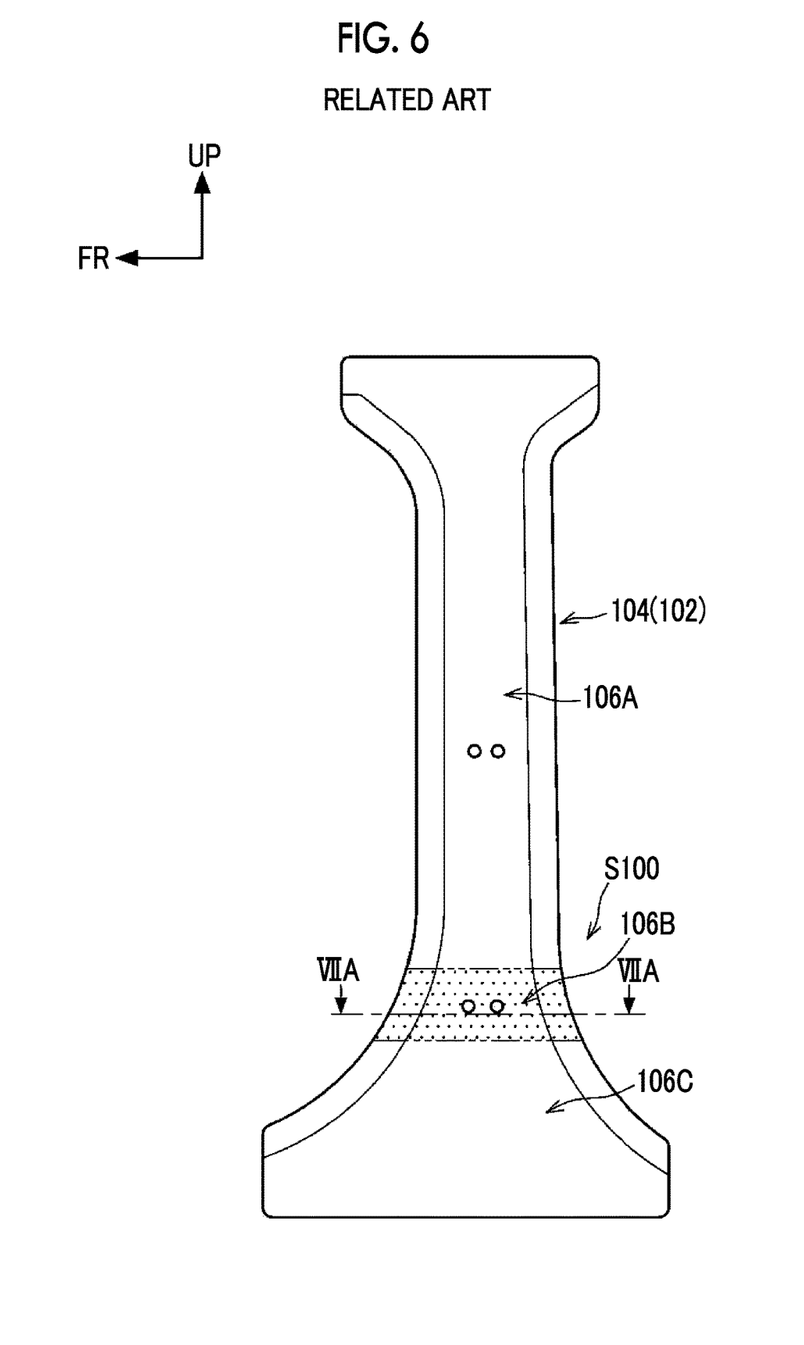
FIG. 6 is a side view illustrating a center pillar outer panel to which a center pillar structure according to a comparative example is applied.
Figure 7A:
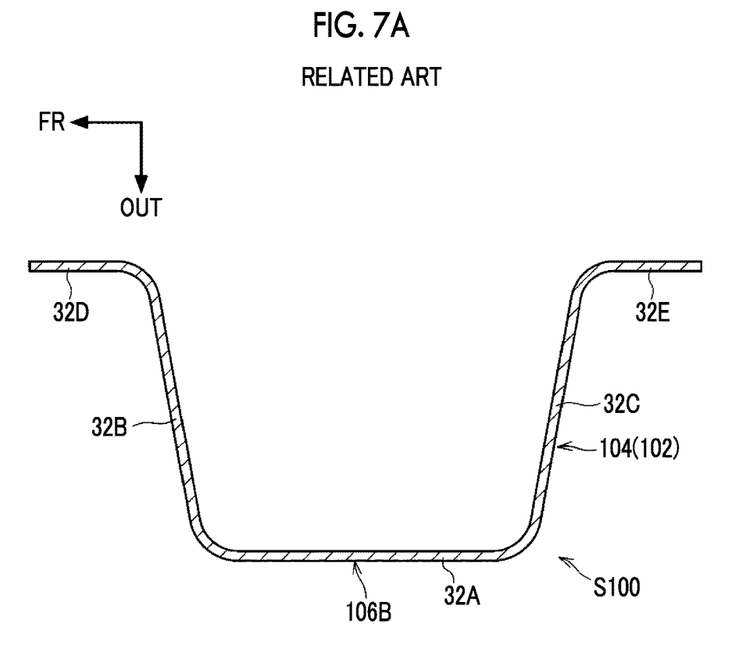
FIG. 7A is a sectional view (a sectional view taken along line VIIA-VIIA in FIG. 6) illustrating the center pillar outer panel to which the center pillar structure according to the comparative example is applied.
Figure 7B:
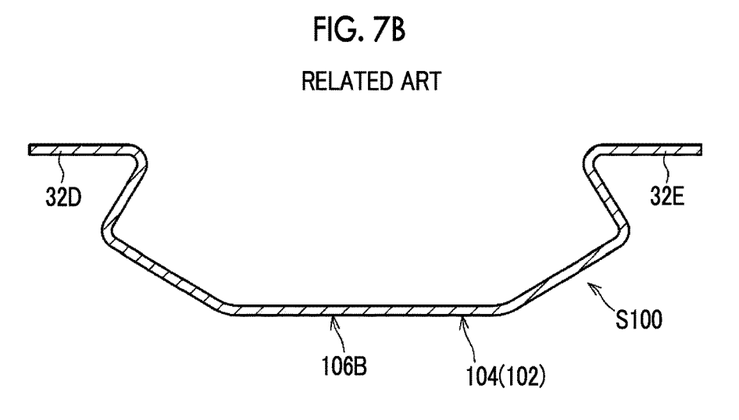
FIG. 7B is a sectional view illustrating a desired deformation mode of the center pillar outer panel to which the center pillar structure according to the comparative example is applied.
Figure 8:
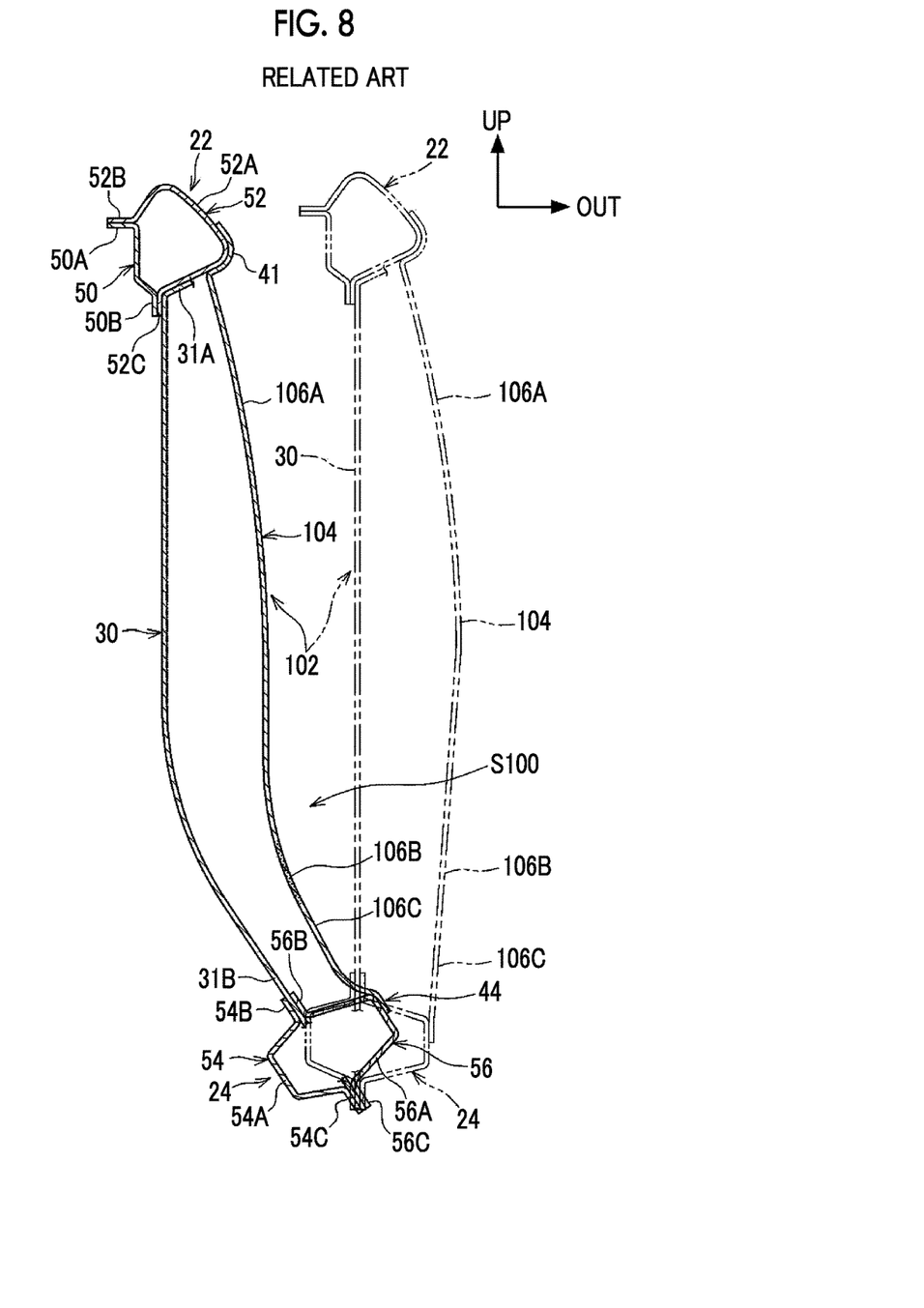
FIG. 8 is a sectional view illustrating a deformation mode of a center pillar at the time of side collision in the center pillar structure according to the comparative example.

In FIGS. 6 to 8, a center pillar structure S100 in a comparative example is illustrated. Note that, the same components as those in the center pillar structure S28 in the above-described embodiment are given the same reference numerals and description thereof will be omitted.

As illustrated in FIG. 6, a pillar outer panel 104 of a center pillar 102 includes a hard portion 106A of which the tensile strength is relatively high, a soft portion 106B of which the tensile strength is lower than that of the hard portion 106A, and a hard portion 106C of which the tensile strength is high as with the hard portion 106A, the hard portion 106A, the soft portion 106B, and the hard portion 106C being arranged in this order in a direction from the upper side to the lower side in the vehicle height direction. The hard portion 106C is provided as a lower portion of the pillar outer panel 104 in the vehicle height direction. The soft portion 106B having a belt shape is provided close to the lower portion of the pillar outer panel 104 in the vehicle height direction and is provided above the hard portion 106C. The hard portion 106A is provided in a region above an intermediate portion of the pillar outer panel 104 and is provided above the soft portion 106B.

The tensile strengths of the hard portion 106A and the hard portion 106C of the pillar outer panel 104 are, for example, 1500 MPa or more. The tensile strength of the soft portion 106B of the pillar outer panel 104 is, for example, 980 MPa or less.

FIG. 7A is a sectional view illustrating a state before the soft portion 106B of the pillar outer panel 104 is deformed. As illustrated in FIG. 7A, the pillar outer panel 104 is formed to have a hat-shaped section and is formed to open inward in the vehicle width direction.

FIG. 7B illustrates a desired deformation mode of the soft portion 106B of the pillar outer panel 104 at the time of side collision. As illustrated in FIG. 7B, it is desired that the soft portion 106B, which is a lower portion of the pillar outer panel 104, is deformed at the time of side collision such that the soft portion 106B, which is the lower portion of the pillar outer panel 104, is crushed inward in the vehicle width direction.

However, when side collision actually occurs, the soft portion 106B, which is the lower portion of the pillar outer panel 104, extends in the vertical direction also as illustrated with solid lines in FIG. 8. As a result, an intrusion amount of the center pillar 102 toward the inner side in the vehicle width direction (into the vehicle cabin) increases.

However, in the center pillar structure S28 in the embodiment, the pillar lower portion 42 of the pillar outer panel 32 includes the pillar lower main body portion 42A of which the tensile strength is lower than the tensile strength of the pillar upper portion 40 and the high-strength portion 42B that is disposed in the intermediate portion of the pillar lower portion 42 in the vehicle width direction while extending in the vehicle height direction and of which the tensile strength is higher than the tensile strength of the pillar lower main body portion 42A. Accordingly, the high-strength portion 42B of the pillar lower portion 42 of the pillar outer panel 32 is further restrained from extending in the vehicle height direction at the time of side collision. Therefore, it is possible to further reduce the intrusion amount of the center pillar toward the inner side in the vehicle width direction (into the vehicle cabin).

Note that, in the center pillar structure S28 in the embodiment, the shape and position of the pillar lower main body portion 42A of the pillar lower portion 42 of the pillar outer panel 32 and the shape and the position of the high-strength portion 42B are changeable.

What is claimed is:

1. A center pillar structure comprising:
a center pillar including a center pillar outer panel that extends in a vehicle height direction on a side portion of a vehicle, the center pillar outer panel constituting an outer side of the center pillar in a vehicle width direction, wherein the center pillar outer panel includes:
an outer wall portion that is disposed on the outer side in the vehicle width direction while extending in a vehicle front-rear direction;
a front vertical wall portion that extends inwards in the vehicle width direction from a front end portion of the outer wall portion in the vehicle front-rear direction;
a rear vertical wall portion that extends inwards in the vehicle width direction from a rear end portion of the outer wall portion in the vehicle front-rear direction;
a pillar upper portion that constitutes an upper portion of the center pillar outer panel and is bonded to a roof side rail that extends in the vehicle front-rear direction; and
a pillar lower portion that constitutes a lower portion of the center pillar outer panel and is bonded to a rocker that extends in the vehicle front-rear direction, wherein the pillar lower portion includes
a pillar lower main body portion having a tensile strength that is lower than a tensile strength of the pillar upper portion, and
a high-strength portion that is disposed at the pillar lower portion and extends in the vehicle height direction, the high-strength portion
having a tensile strength that is higher than the tensile strength of the pillar lower main body portion, and
being located only between (i) a ridge located between the outer wall portion and the rear vertical wall portion and (ii) a ridge located between the outer wall portion and the front vertical wall portion.

2. The center pillar structure according to claim 1, wherein:
the tensile strengths of the pillar upper portion and the high-strength portion are 1500 MPa or more; and
the tensile strength of the pillar lower main body portion is 980 MPa or less.

3. The center pillar structure according to claim 1, wherein the high-strength portion is provided at a center of the pillar lower portion in the vehicle front-rear direction.

4. The center pillar structure according to claim 1, wherein the high-strength portion is provided inward of a ridge on the pillar lower portion in an in-plane direction, the ridge extending along the vehicle height direction.

5. The center pillar structure according to claim 1, wherein the high-strength portion is provided above a joint between the pillar lower portion and the rocker in the vehicle height direction.

* * * * *